(12) United States Patent
Sheahan, Jr.

(10) Patent No.: US 8,575,891 B2
(45) Date of Patent: Nov. 5, 2013

(54) BATTERY HOUSING SYSTEM AND METHOD

(75) Inventor: James J. Sheahan, Jr., Alton, IL (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 12/861,010

(22) Filed: Aug. 23, 2010

(65) Prior Publication Data

US 2012/0043924 A1   Feb. 23, 2012

(51) Int. Cl.
 *H02J 7/00*   (2006.01)
(52) U.S. Cl.
 USPC ......................................................... 320/107
(58) Field of Classification Search
 USPC .......................................................... 320/107
 See application file for complete search history.

(56) References Cited

U.S. PATENT DOCUMENTS

| 6,461,758 B1 * | 10/2002 | Geibl et al. ..................... 429/72 |
| 2006/0035564 A1 * | 2/2006 | Novak et al. ....................... 451/5 |
| 2006/0261304 A1 | 11/2006 | Muthukumaran et al. |
| 2008/0118819 A1 * | 5/2008 | Gamboa et al. ................. 429/61 |
| 2008/0272736 A1 * | 11/2008 | Tien et al. ...................... 320/126 |
| 2009/0004556 A1 * | 1/2009 | Al-Hallaj et al. ............. 429/120 |
| 2010/0112433 A1 | 5/2010 | Kosugi et al. |

FOREIGN PATENT DOCUMENTS

WO   2009/029534   3/2009

OTHER PUBLICATIONS

PCT, International Search Report, International Application No. PCT/US2011/044970 (mailed Nov. 4, 2011, published Mar. 1, 2012).

* cited by examiner

*Primary Examiner* — Arun Williams
(74) *Attorney, Agent, or Firm* — Clifford Cousins

(57) ABSTRACT

A battery system including a housing that defines an internal volume and a venting system that fluidly couples the internal volume with an atmosphere surrounding the housing and a support structure within the internal volume, the support structure being configured to support a number of battery cell modules in the internal volume.

21 Claims, 2 Drawing Sheets

BATTERY HOUSING SYSTEM AND METHOD

FIELD

This application relates to batteries and, more particularly, to modular battery systems and methods.

BACKGROUND

Advances in battery technology have led to the use of batteries as an essential power source. For example, batteries have been used to supply power during peak load times and as emergency back-up systems.

High energy density batteries are particularly attractive. For example, traditional lead-acid batteries may be capable of supplying 25 watts per kilogram of battery. In contrast, lithium-ion batteries may be capable of providing 150 watts per kilogram of battery. Therefore, high energy density batteries, such as lithium-ion batteries, are advantageous when overall weight is a consideration, such as on aircraft and automobiles.

Unfortunately, specific battery sizes are generally required for specific applications. As such, a vehicle that uses three batteries may, due to the application, require three different sizes of batteries. For example, a vehicle's back-up system may employ one type of battery, while the vehicle's navigation system may be backed-up with a different size or type of battery. As such, users that deploy a variety of batteries in a variety of applications are required to stock many different sizes and ratings of batteries.

As indicated above, batteries are relatively heavy. Therefore, stocked batteries on a vehicle significantly increase the overall weight of the vehicle. This increase in weight is even more significant when multiple different types of batteries are being stocked due to the greater number of batteries present. Furthermore, stocked batteries occupy a significant amount of space, which may be limited in the case of vehicles (e.g., aircraft).

Accordingly, those skilled in the art continue with research and development efforts in the field of battery systems and methods.

SUMMARY

In one aspect, the disclosed battery system may include a housing that defines an internal volume and a vent or series of vents that fluidly couples the internal volume with an atmosphere surrounding the housing and a support structure within the internal volume, the support structure being configured to support a plurality of battery cell modules within the internal volume.

In another aspect, the disclosed battery system may include a housing that defines an internal volume and a vent or series of vents that fluidly couples the internal volume with an atmosphere surrounding the housing, a plurality of battery cell modules received in the internal volume and a charging system configured to identify malfunctioning cell modules and non-malfunctioning cell modules within the plurality of battery cell modules and to electrically isolate the malfunctioning cell modules from the non-malfunctioning cell modules, wherein the charging system supplies a charging voltage to the non-malfunctioning cell modules and increases the charging voltage to the non-malfunctioning cells based on the number or malfunctioning cell modules identified.

In yet another aspect, the disclosed method for operating a battery system at a target voltage may include the steps of (1) providing a housing that defines an internal volume and a vent that fluidly couples the internal volume with an atmosphere surrounding the housing, (2) placing a plurality of battery cell modules into the internal volume, (3) applying a charging voltage to the battery cell modules, (4) monitoring the battery cell modules to identify malfunctioning battery cell modules and, when a malfunctioning battery cell module is identified, (5) electrically isolating the malfunctioning battery cell module from the other battery cell modules and (6) increasing the charging voltage applied to the other battery cell modules to maintain a normal output level.

Other aspects of the disclosed battery system and method for assembling a battery system will become apparent from the following description, the accompanying drawings and the appended claims.

DETAILED DESCRIPTION

Figure 1:
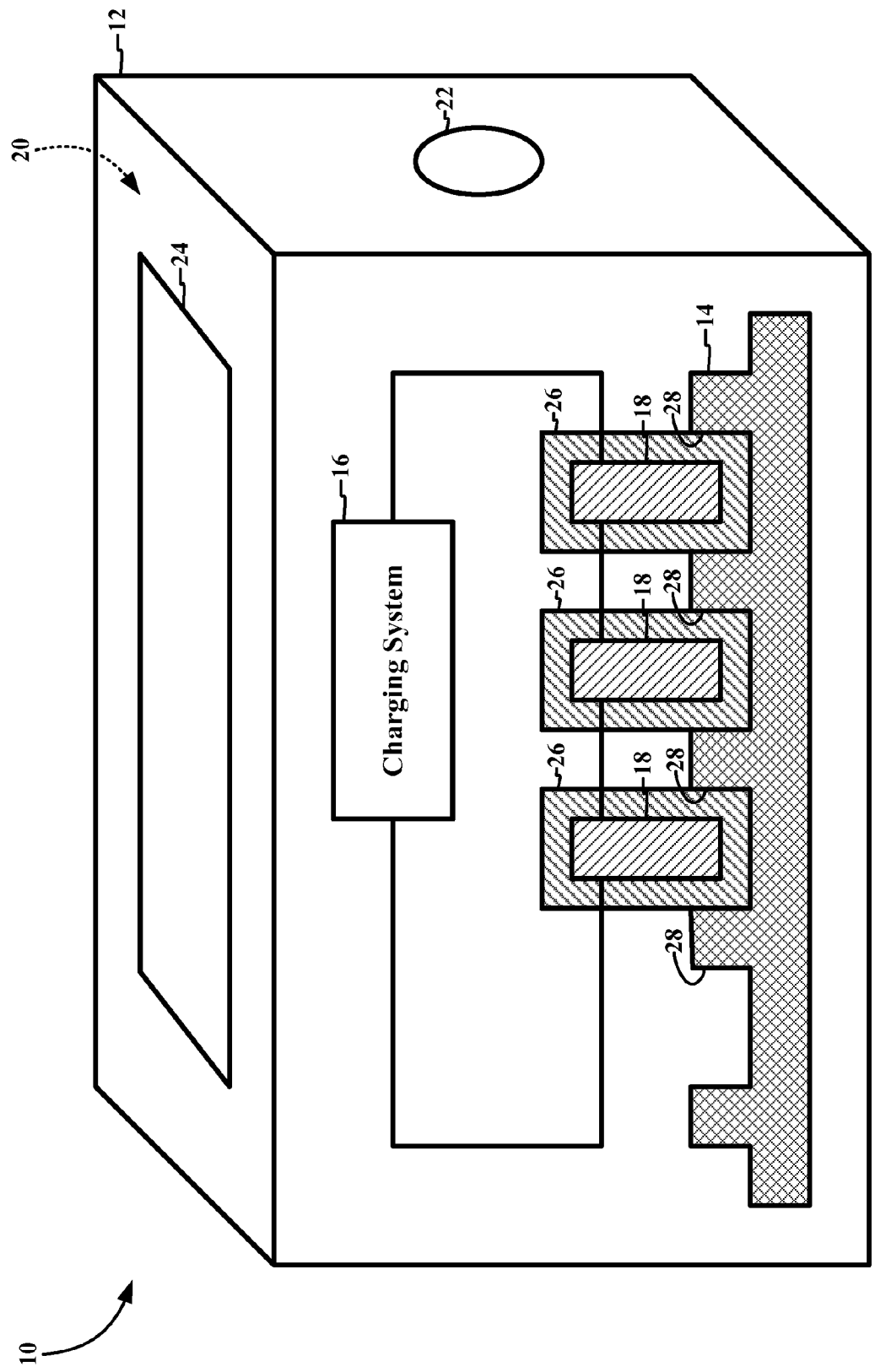
FIG. 1 is a schematic front perspective view of one aspect of the disclosed battery system.

Referring to FIG. 1, one aspect of the disclosed battery system, generally designated 10, may include a housing 12, a support structure 14, a charging system 16 and a plurality of battery cell modules 18. Additional components may be included in the battery system 10 without departing from the scope of the present disclosure.

The housing 12 may be any structure that defines an internal volume 20 having a sufficient size and shape to receive the battery cell modules 18 therein. Therefore, the overall dimensions of the housing 12 may be dictated by the dimensions of the battery cell modules 18 and the total number of battery cell modules 18 capable of being received in the internal volume 20. In one particular construction, the housing 12 may be a rectilinear body, such as a box having six side walls, as shown in FIG. 1. Other constructions of the housing 12 are left to the skilled artisan.

The housing 12 may define a vent 22 (or a series of vents) that provides fluid communication between the internal volume 20 and the atmosphere surrounding the housing 12. The vent(s) 22 may be sized and positioned to allow for the free escape of gases from the internal volume 20 in the event that one or more of the battery cell modules 18 undergoes a thermal runaway event. While not shown, a multitude of vents may be included to further facilitate the escape of gases without departing from the scope of the present disclosure.

The housing 12 may further define a resealable opening 24 that provides access to the internal volume 20. Access to the internal volume 20 may be needed to add, replace and/or remove battery cell modules 18. Specifically, in one implementation, the housing 12 may fully enclose the internal volume 20, but for the vent 22, and the resealable opening 24 may provide the user with access to the internal volume 20. As one example, the resealable opening 24 may include a hinged lid and a latch for securing the hinged lid to the housing 12. As another example, the resealable opening 24 may include a lid that slides relative to the housing 12 to open and close the opening 24.

The housing 12 may be formed from various materials or combinations of materials. In one expression, the housing 12 may be formed from a rigid material, such as metal or plastic. In another expression, the housing 12 may be formed from a heat resistant material, such as metal (e.g., aluminum) or phenolic resin. Specifically, the heat resistant material may be capable of withstanding temperatures of up to 100° C. without significantly degrading (e.g., melting or becoming soft).

Each battery cell module 18 may include one or more electrochemical cells or, more typically, two or more electrochemical cells. In one specific implementation, the battery cell modules 18 may include lithium-ion cells. Examples of suitable battery cell modules 18 that include lithium-ion cells are available, but not exclusively, from battery manufacturers such as A123 Systems, Inc. of Watertown, Mass. and Quallion LLC of Sylmar, Calif. In other implementations, the battery cell modules 18 may include lithium polymer cells, lead-acid cells, nickel cadmium cells and/or nickel metal hydride cells or other rechargeable battery material.

Each battery cell module 18 may have a module voltage, which may depend on, among other possible factors, the number and type of electrochemical cells present in the battery cell module 18. The module voltage of a battery cell module 18 may be a voltage within a range of possible module voltages. For example, a battery cell module 18 may be configured to operate at a voltage ranging from 1.5 to 2.5 volts, and may be specifically charged at 2.0 volts, which may be the nominal voltage of the module 18.

The battery cell modules 18 may be electrically interconnected, such as in series, to achieve the target voltage of the battery system 10. The number of battery cell modules 18 in the battery system 10 may depend on the module voltages of the battery cell modules 18 and the target voltage of the battery system 10. For example, when the target voltage of the battery system 10 is 10 volts, five battery cell modules having a nominal voltage of 2 volts may be placed into the internal volume 20 of the housing 12 and electrically interconnected in series. If a higher voltage is required at a later time, then additional battery cell modules 18 may be added. If a lower voltage is required at a later time, then one or more of the five battery cell modules 18 may be disconnected from the string and removed from the housing 12.

As shown in FIG. 1, some or all of the battery cell modules 18 of the battery system 10 may be placed in an associated containment device 26. The containment device 26 may be any apparatus or system configured to contain at least some of the energy released during thermal runaway of the associated battery cell module 18. Specifically, the containment devices 26 may be configured to retain the heat/plasma (possibly also electrolyte and debris) expelled from a battery cell module 18 that is undergoing a thermal runaway event.

In one specific implementation, the containment devices 26 may be covers, such as sleeves, pouches or the like, that are closely received over the battery cell modules 18. Each such cover may be formed as a layered structure that includes at least one layer of woven ceramic fabric, such as a layer of NEXTEL™ woven fabric available from 3M Company, Inc. of St. Paul, Minn., and at least one layer that includes oxidized polyacrylonitrile fibers, such as a layer of CarbonX® flame retardant fabric available from Chapman Thermal Products, Inc. of Salt Lake City, Utah. Such containment devices 26 are described in greater detail in U.S. Ser. No. 12/575,042 filed on Oct. 7, 2009, the entire contents of which are incorporated herein by reference. Accordingly, without being limited to any particular theory, it is believed that a containment device 26 having at least the one layer of woven ceramic fabric, and at least the one layer of oxidized polyacrylonitrile fibers described above can contain an exothermic event by allowing gases to vent through the fabric pores, but not in concentrated plumes or plasmas, while containing hot high velocity debris.

Still referring to FIG. 1, the battery system 10 may include the support structure 14 for supporting the battery cell modules 18 within the internal volume 20 relative to the housing 12. Those skilled in the art will appreciate that any apparatus or system may be used to support the battery cell modules 18 in the internal volume 20. In one expression, the support structure 14 may define a plurality of ports 28 (e.g., channel, grooves or recesses) for receiving and securing the battery cell modules 18. In another expression, the support structure 14 may include fasteners, such as straps, hooks, clamps, cords and the like, for engaging and securing the battery cell modules 18.

At this point, those skilled in the art will appreciate that the support structure 14 may be capable of supporting a maximum number of battery cell modules 18, but that the actual number of battery cell modules 18 supported by the support structure 14 may depend on the number of battery cell modules 18 required to achieve the target voltage of the battery system 10. For example, the support structure 14 may be capable of supporting twenty-one two volt battery cell modules 18 for a maximum output of 42 volts, but may only support six such battery cell modules 18 when the target voltage is only 12 volts.

The charging system 16 may be electrically coupled to each of the battery cell modules 18 of the battery system 10. The charging system 16 may include electronics or the like configured to charge the battery cell modules 18 by applying a charging voltage to the battery cell modules 18.

The charging system 16 may further include electronics or the like configured to monitor the voltage and/or current of each battery cell module 18 to determine whether the battery cell modules 18 are functioning properly or whether a malfunction has a occurred in one or more of the battery cell modules. For example, the charging system 16 may identify a malfunction as a drop in the voltage or current of a battery cell module 18 below a predetermined threshold value.

The charging system 16 may further include electronics or the like configured to electrically isolate malfunctioning battery cell modules 18 from the functioning battery cell modules 18. For example, the electronics of the charging system 16 may include various switches for electrically isolating the malfunctioning battery cell modules 18 from the non-malfunctioning battery cell modules 18.

Figure 2:
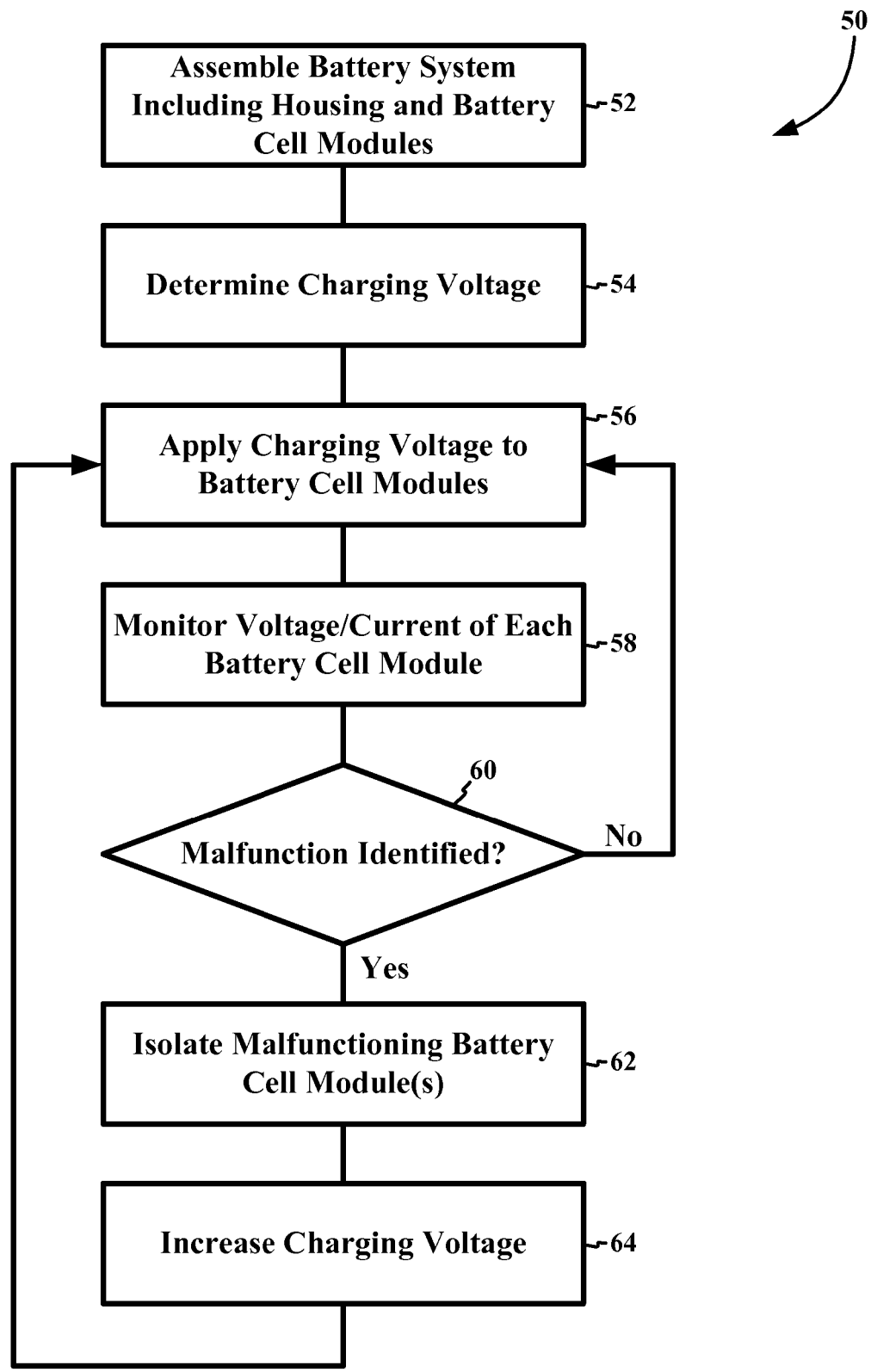
FIG. 2 is a flow chart illustrating one aspect of the disclosed method for assembling a battery system having a target voltage.

In another aspect, the battery system 10 may be operated at a target voltage using the steps of the method 50 shown in FIG. 2. At step 52, the battery system 10 may be assembled as described above. Specifically, a number of battery cell modules 18 may be placed into the internal volume 20 of the housing 12 and electrically interconnected (e.g., in series) to achieve the target voltage.

The charging system 16 may determine (step 54) a charging voltage that should be applied to the battery cell modules 18 and may apply the charging voltage to the non-malfunctioning battery cell modules 18 of the battery system 10. The charging voltage may depend on the module voltage of the battery cell modules 18, the total number of interconnected battery cell modules 18 and the target voltage. For example, when five battery cell modules 18 are interconnected to achieve a target voltage of 10 volts, and each battery cell module 18 has a module voltage ranging from 1.5 to 2.5 volts, then the charging system 16 may apply a charging voltage of 2 volts (5 modules×2 volts=10 volts).

At step 58, the charging system 16 may monitor the voltage and/or the current generated by each battery cell module 18. At step 60, the measured voltage and/or current may be compared to predetermined threshold values to determine whether a malfunction has occurred. For example, if the voltage and/or current of a particular battery cell module 18 drops below the associated predetermined threshold value, then that battery cell module 18 may be deemed to be experiencing a malfunction (i.e., it is a malfunctioning module). The battery cell modules 18 that are not deemed to be experiencing a malfunction based on voltage and/or current monitoring may be treated as non-malfunctioning modules.

Still referring to step 60, if no malfunction is identified, then the method 50 may continue charging the non-malfunctioning battery cell modules 18 (i.e., return to step 56). However, if one or more malfunctioning modules are identified, corrective action may be taken at steps 62 and 64.

At step 62, the malfunctioning battery cell modules 18 may be electrically isolated from the non-malfunctioning battery cell modules 18. At step 64, the charging voltage may be increased to compensate for the isolated module(s) 18. Specifically, as noted above, the module voltage may be a range. Therefore, if one or more battery cell modules 18 are isolated, the voltage across the remaining battery cell modules 18 may be increased to compensate for the isolated modules.

For example, when five battery cell modules 18 are interconnected to achieve a target voltage of 10 volts, and each battery cell module 18 has a module voltage ranging from 1.5 to 2.5 volts, then the charging system 16 will applying a charging voltage of 2 volts, as noted above. However, when one of the five battery cell modules 18 is electrically isolated, leaving only four battery cell modules 18 in series, the charging voltage applied to the remaining battery cell modules 18 may be increase to 2.5 volts (the top of the module voltage range) to maintain the net effect of 10 volts. With an increase in the number of modules the voltage charging step will be reduced.

Accordingly, the disclosed battery system 10 may be capable of operating at a range of power levels using a single housing and various combinations of battery cell modules 18. The charging system 16 may automatically increase the charging voltage and/or current to maintain the target voltage in the event that one or more of the battery cell modules 18 experiences a malfunction.

Although various aspects of the disclosed battery system and method have been shown and described, modifications may occur to those skilled in the art upon reading the specification. The present application includes such modifications and is limited only by the scope of the claims.

What is claimed is:

1. A battery system comprising:
   a housing at least partially enclosing an internal volume, said housing being made of a heat-resistant material and including at least one vent that fluidly couples said internal volume with an atmosphere surrounding said housing;
   at least one containment device located within said internal volume;
   at least one battery cell module placed in said at least one containment device, said containment device being configured to retain electrolyte and debris released during a thermal runaway of said at least one battery cell module; and
   a support structure within said internal volume, said support structure configured to support said at least one containment device in said internal volume.

2. The battery system of claim 1, further comprising said containment device being configured to retain one of heat or plasma expelled from said at least one battery cell module during said thermal runaway event.

3. The battery system of claim 2, wherein said at least one battery cell module is selected from at least one rechargeable cell, at least one electrochemical cell, at least one lithium-ion cell, at least one lithium polymer cell, at least one lead-acid cell, at least one nickel cadmium cell, and at least one nickel metal hydride cell.

4. The battery system of claim 2, wherein said at least one containment device includes one of a cover, a sleeve and a pouch.

5. The battery system of claim 4, wherein said at least one containment device comprises a layer of woven ceramic fabric and a layer of oxidized polyacrylonitrile fibers.

6. The battery system of claim 1, wherein said housing comprises a resealable opening into said internal volume for maintenance or modification of said at least one battery cell module.

7. The battery system of claim 1, wherein said support structure defines a plurality of ports for receiving and securing said at least one battery cell module.

8. The battery system of claim 7, wherein each port of said plurality of ports is resizable.

9. The battery system of claim 1, further comprising a charging system electrically connectable to said plurality of battery cell modules.

10. The battery system of claim 9, wherein said charging system is integrated with said housing.

11. The battery system of claim 9, wherein said charging system comprises electronics configured to identify malfunctioning cell modules and non-malfunctioning cell modules within said plurality of battery cell modules.

12. The battery system of claim 11, wherein said charging system is further configured to electrically isolate said malfunctioning cell modules from said non-malfunctioning cell modules.

13. The battery system of claim 12, wherein said charging system is further configured to supply a charging voltage to said non-malfunctioning cell modules and to increase said charging voltage within a safe battery charge range when said malfunctioning cell modules are isolated.

14. A battery system comprising:
   a housing defining an internal volume, said housing being made of a heat-resistant material, said housing fully enclosing said internal volume and including at least one vent that fluidly couples said internal volume with an atmosphere surrounding said housing;
   a plurality of containment devices located within said internal volume;
   a plurality of battery cell modules being placed in said plurality of containment devices, said plurality of containment devices being configured to retain electrolyte and debris released during a thermal runaway of one of said plurality of battery cell modules placed therein;
   a support structure within said internal volume, said support structure supporting said plurality of containment devices in said internal volume; and
   a charging system configured to identify malfunctioning cell modules and non-malfunctioning cell modules within said plurality of battery cell modules and to electrically isolate said malfunctioning cell modules from said non-malfunctioning cell modules, wherein said charging system supplies a charging voltage to said non-malfunctioning cell modules and increases said charging voltage to maintain operating ratings when said malfunctioning cell modules are isolated.

15. The battery system of claim 14, wherein said support structure defines a plurality of ports for receiving and securing said plurality of battery cell modules.

16. The battery system of claim 14, wherein said plurality of containment devices are configured to retain material selected from at least one of heat or plasma expelled from said plurality of battery cell modules during said thermal runaway event.

17. The battery system of claim 14, wherein said plurality of containment devices is selected from a cover, a sleeve and a pouch.

18. The battery system of claim 14, wherein said housing comprises a resealable opening into said internal volume.

19. The battery system of claim 14, wherein each of said plurality of containment devices comprises a layer of woven ceramic fabric and a layer of oxidized polyacrylonitrile fibers.

20. A method for operating a battery system at a target voltage, the method comprising:
   providing a housing defining an internal volume, said housing being made of a heat-resistant material and including a vent that fluidly couples said internal volume with an atmosphere surrounding said housing, said housing fully enclosing said internal volume but for said vent;
   placing a plurality of battery cell modules into a plurality of containment devices, said containment devices each being configured to retain electrolyte and debris released during a thermal runaway of one or more of said plurality of battery cell modules placed therein;
   providing a support structure within said internal volume, and supporting said plurality of containment devices on said support structure;
   applying a charging voltage to said plurality of battery cell modules;
   monitoring each battery cell module of said plurality to identify a malfunctioning battery cell module within said plurality; and
   when said malfunctioning battery cell module is identified, electrically isolating said malfunctioning battery cell module from said other battery cell modules of said plurality; and
   increasing said charging voltage applied to said other battery cell modules of said plurality.

21. A battery system comprising:
   a housing at least partially enclosing an internal volume, said housing being made of a heat-resistant material and including at least one vent that fluidly couples said internal volume with an atmosphere surrounding said housing;
   at least one containment device located within said internal volume and configured to contain at least one battery cell module, said containment device being configured to retain electrolyte and debris released during a thermal runaway of said at least one battery cell module; and
   a support structure within said internal volume, said support structure configured to support said at least one containment device in said internal volume.

* * * * *

UNITED STATES PATENT AND TRADEMARK OFFICE
CERTIFICATE OF CORRECTION

PATENT NO.        : 8,575,891 B2               Page 1 of 1
APPLICATION NO.   : 12/861010
DATED             : November 5, 2013
INVENTOR(S)       : James J. Sheahan, Jr.

It is certified that error appears in the above-identified patent and that said Letters Patent is hereby corrected as shown below:

In the Claims

Column 6, Claim 15, Line 64 and 65 read:

"structure defines a plurality of ports for receiving and securing and securing said plurality of battery cell modules"

It should read:

-- structure defines a plurality of ports for receiving and securing said plurality of battery cell modules. --

Signed and Sealed this
Eleventh Day of February, 2014

Michelle K. Lee
*Deputy Director of the United States Patent and Trademark Office*